(12) United States Patent
Hsiao et al.

(10) Patent No.: US 12,534,148 B2
(45) Date of Patent: Jan. 27, 2026

(54) WATER BOTTLE HOLDING DEVICE (71) Applicants: Chung-Pin Hsiao, Taichung (TW); Chen-Kuei Wu, Taichung (TW)

(72) Inventors: Chung-Pin Hsiao, Taichung (TW); Chen-Kuei Wu, Taichung (TW)

(73) Assignee: SIENNA GROUP CORPORATION, Taichung (TW)

( * ) Notice: Subject to any disclaimer, the term of this patent is extended or adjusted under 35 U.S.C. 154(b) by 74 days.

(21) Appl. No.: 18/606,975

(22) Filed: Mar. 15, 2024

(65) Prior Publication Data
US 2024/0326941 A1    Oct. 3, 2024

(30) Foreign Application Priority Data

Mar. 30, 2023  (TW) ................................ 112112333

(51) Int. Cl.
*B62J 11/04* (2020.01)
(52) U.S. Cl.
CPC ..................... *B62J 11/04* (2020.02)
(58) Field of Classification Search
CPC ........................................ B62J 11/04
USPC ......................................... 224/414; D12/411
See application file for complete search history.

(56) References Cited

U.S. PATENT DOCUMENTS

| | | | | | |
|---|---|---|---|---|---|
| 4,176,770 | A | * | 12/1979 | Griggs | B62J 9/21 224/451 |
| 4,386,721 | A | * | 6/1983 | Shimano | B62J 11/04 224/462 |
| D271,852 | S | * | 12/1983 | Kimura | D12/411 |
| 4,441,638 | A | * | 4/1984 | Shimano | B62J 11/04 224/462 |
| 5,170,658 | A | * | 12/1992 | Thayer | B62J 11/22 224/431 |
| 5,238,160 | A | * | 8/1993 | Faulds | B62J 11/04 224/462 |
| 10,407,120 | B2 | * | 9/2019 | Seear | B62K 3/10 |

(Continued)

FOREIGN PATENT DOCUMENTS

| | | | | |
|---|---|---|---|---|
| CA | 2277881 | A1 * | 2/2000 | B62J 11/04 |
| CN | 201977039 | U * | 9/2011 | B62J 11/00 |

(Continued)

OTHER PUBLICATIONS

Profile Design HSC 250, from website, <https://profile-design.com/products/hsc-250?srsltid=AfmBOopb7i8dcO1V96dZh2ob9D0uj1I VQRcOd4j9zNiW63q3j6UFvKNx> accessed Jul. 24, 2025.*

*Primary Examiner* — Justin M Larson
(74) *Attorney, Agent, or Firm* — Demian K. JJackson; Jackson IPG PLLC (57) ABSTRACT

A water bottle holding device is mounted on top of a top tube of a bicycle frame and located behind a head tube, and includes a water bottle and a water bottle cage. The water bottle includes a water bottle body, a water bottle cap, and a mouthpiece. The water bottle body has a blocking rim on a periphery of a front end thereof and a first engaging portion on each of two sides thereof. The water bottle cage has a width about equal to or less than a width of a stem body of a bicycle stem. The water bottle cage has a receiving room at a front section thereof, a positioning baffle on each of two sides thereof, a second engaging portion on an inner side of the positioning baffle, locking holes passing through a bottom thereof, and a rear end that is an open end.

13 Claims, 15 Drawing Sheets

(56) References Cited

U.S. PATENT DOCUMENTS

| | | | | |
|---|---|---|---|---|
| 2010/0059565 A1* | 3/2010 | Cote | ............................ | B62J 9/22 |
| | | | | 224/463 |
| 2024/0140548 A1* | 5/2024 | Delport | ....................... | B62J 9/27 |
| 2024/0326941 A1* | 10/2024 | Hsiao | ......................... | B62J 11/04 |

FOREIGN PATENT DOCUMENTS

| | | | | | |
|---|---|---|---|---|---|
| DE | 202017104340 | U1 * | 8/2017 | .............. | B62K 21/12 |
| FR | 2663603 | A1 * | 12/1991 | .............. | B62J 11/04 |
| WO | WO-9219487 | A1 * | 11/1992 | .............. | B62J 11/04 |

\* cited by examiner

WATER BOTTLE HOLDING DEVICE

FIELD OF THE INVENTION

The present invention relates to a water bottle holding device, and more particularly to a water bottle holding device that is mounted on top of a top tube of a bicycle frame and located behind a head tube, thereby providing easy access to a water bottle for drinking while riding and increasing the riding speed.

BACKGROUND OF THE INVENTION

Figure 1:
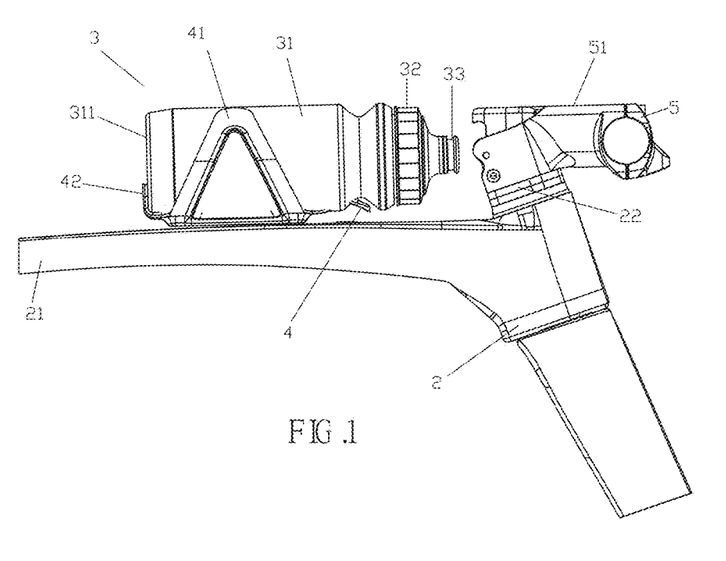
FIG. 1 is a front view of a conventional water bottle holding device.
Figure 2:
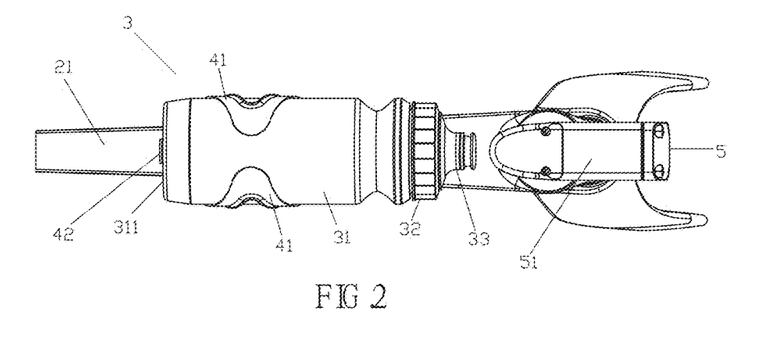
FIG. 2 is a top view of the conventional water bottle holding device.
Figure 3:
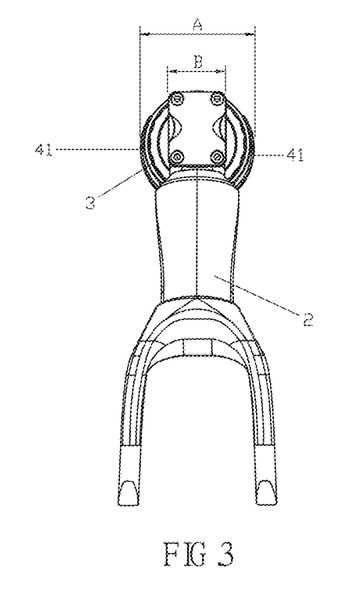
FIG. 3 is a right side view of the conventional water bottle holding device.

Referring to FIG. 1 through FIG. 3, a conventional water bottle holding device mounted on top of a top tube 21 of a bicycle frame 2 and located behind a head tube 22 comprises a water bottle 3 and a water bottle cage 4. The water bottle 3 includes a cylindrical water bottle body 31, a water bottle cap 32, and a mouthpiece 33. The water bottle cage 4 is locked to the top tube 21 of the bicycle frame 2 and located behind the head tube 22. The water bottle cage 4 includes elastic restricting pieces 41 on both sides and an L-shaped positioning piece 42 located on the rear end and extending upwards from the bottom thereof, so that the water bottle cage 4 has a hollow cylindrical shape. When a distal end 311 of the water bottle body 31 is placed into the hollow cylindrical water bottle cage 4 from the front end of the water bottle cage 4, the water bottle body 31 is positioned in the water bottle cage 4 through the elastic restricting pieces 41 on both sides of the water bottle cage 4 and the L-shaped positioning piece 42 extending from the bottom of the water bottle cage 4.

When a bicyclist needs to drink water during a ride, the water bottle body 31 of the water bottle 3 positioned in the water bottle cage 4 is slightly moved from the water bottle cage 4 towards the head tube 22 of the bicycle and then pulled upwards, so that the entire water bottle 3 can be separated from the water bottle cage 4, and the bicyclist can sip water from the mouthpiece 33 of the water bottle 3 to quench his/her thirst and replenish water.

Although the conventional water bottle holding device mounted on top of the top tube 21 of the bicycle frame 2 and located behind the head tube 22 provides a solution to the problem of drinking water during a ride, the mouthpiece 33 is exposed to the outside and is not covered by any lid. The mouthpiece 33 would be susceptible to contamination by external environmental pollutants such as dust or rainwater. Further, the width A of the elastic restricting pieces 41 on both sides of the water bottle cage 4 is greater than the width B of a stem body 51 of a bicycle stem 5. As a result, the water bottle 3 positioned in the water bottle cage 4 creates a wind resistance when the rider is riding forward, which in turn affects the riding speed. Accordingly, the inventor of the present invention has devoted himself based on his many years of practical experiences to solve these problems.

SUMMARY OF THE INVENTION

The primary object of the present invention is to provide a water bottle holding device.

In order to achieve the foregoing object, the water bottle holding device provided by the present invention is mounted on a top tube of a bicycle frame and located behind a head tube. The water bottle holding device comprises a water bottle and a water bottle cage. The water bottle includes a water bottle body, a water bottle cap, and a mouthpiece. The water bottle body has a blocking rim on a periphery of a front end thereof and a first engaging portion on each of two sides thereof. The water bottle cage has a width about equal to or less than a width of a stem body of a bicycle stem. The water bottle cage has a receiving room at a front section thereof, a positioning baffle on each of two sides thereof, a second engaging portion on an inner side of the positioning baffle, a plurality of locking holes passing through a bottom thereof, and a rear end that is an open end. When the water bottle cage is mounted to the top tube of the bicycle frame and located behind the head tube, the water bottle is inserted from the rear end of the water bottle cage, so that the mouthpiece and the water bottle cap on the front end of the water bottle are inserted and hidden in the receiving room at the front section of the water bottle cage to avoid contamination by pollutants such as sand, dust or rain. Besides, the width of the water bottle cage is about equal to or less than the width of the stem body of the bicycle stem. When the bicyclist is riding, the entire water bottle holding device has a wind-breaking shape to increase the riding speed.

DETAILED DESCRIPTION OF THE PREFERRED EMBODIMENTS

Embodiments of the present invention will now be described, by way of example only, with reference to the accompanying drawings.

Referring to FIG. 4 through FIG. 19, the present invention discloses a water bottle holding device, mounted on top of a top tube 61 of a bicycle frame 6 and located behind a head tube 62. The water bottle holding device comprises a water bottle 7 and a water bottle cage 8.

Figure 4:
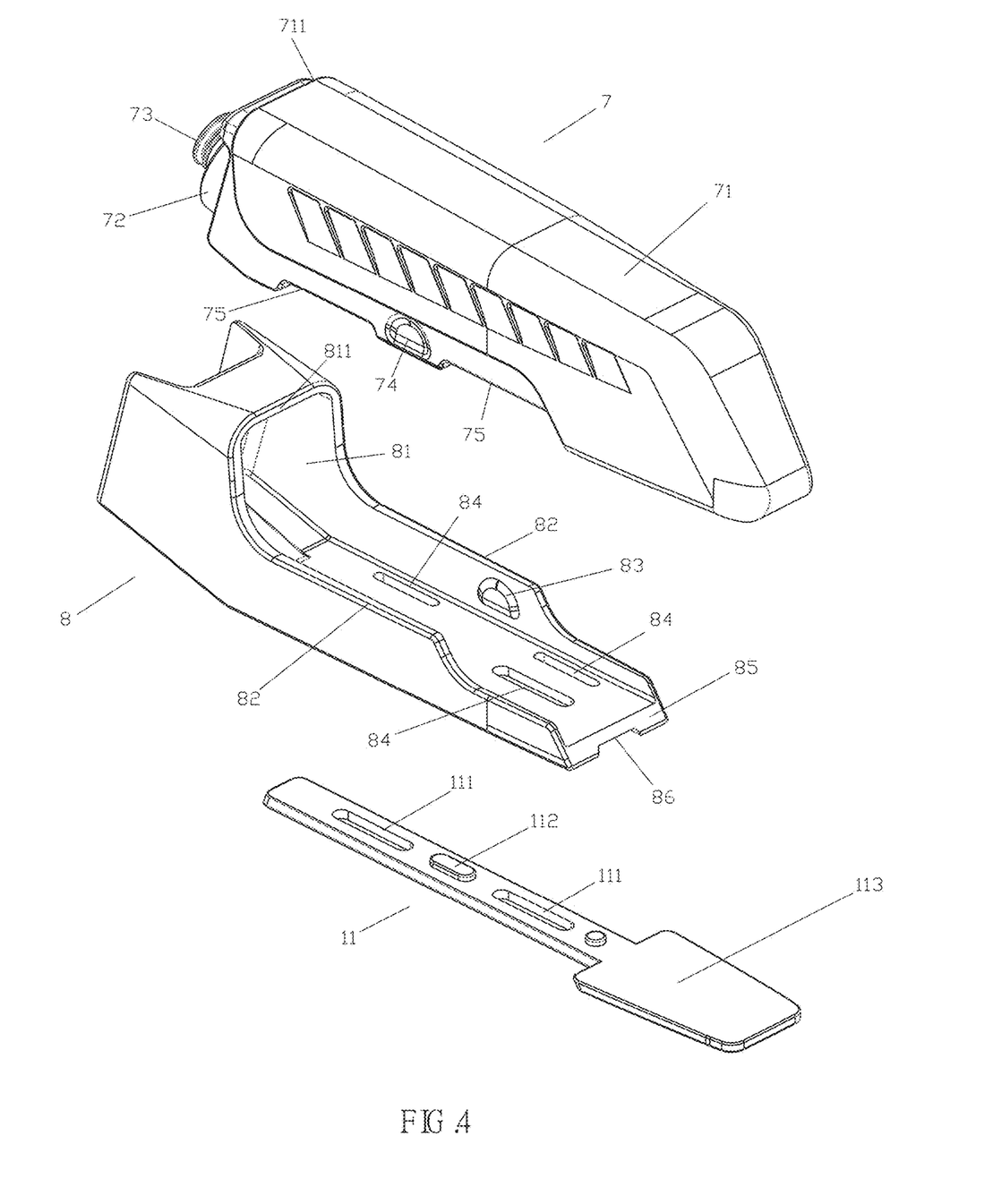
FIG. 4 is an exploded view of a water bottle holding device of the present invention.
Figure 5:
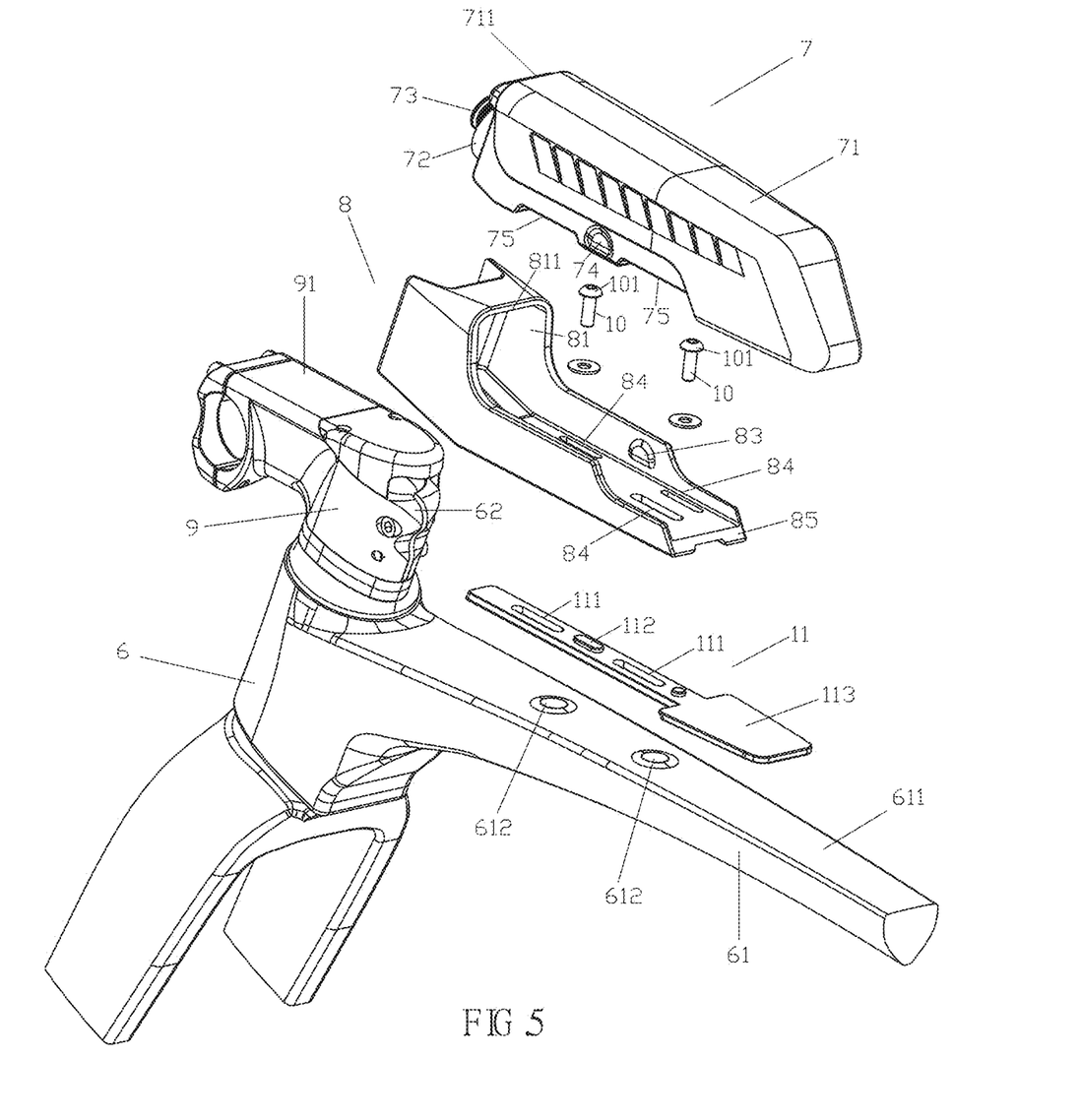
FIG. 5 is an exploded view of the water bottle holding device according to an embodiment of the present invention.
Figure 6:
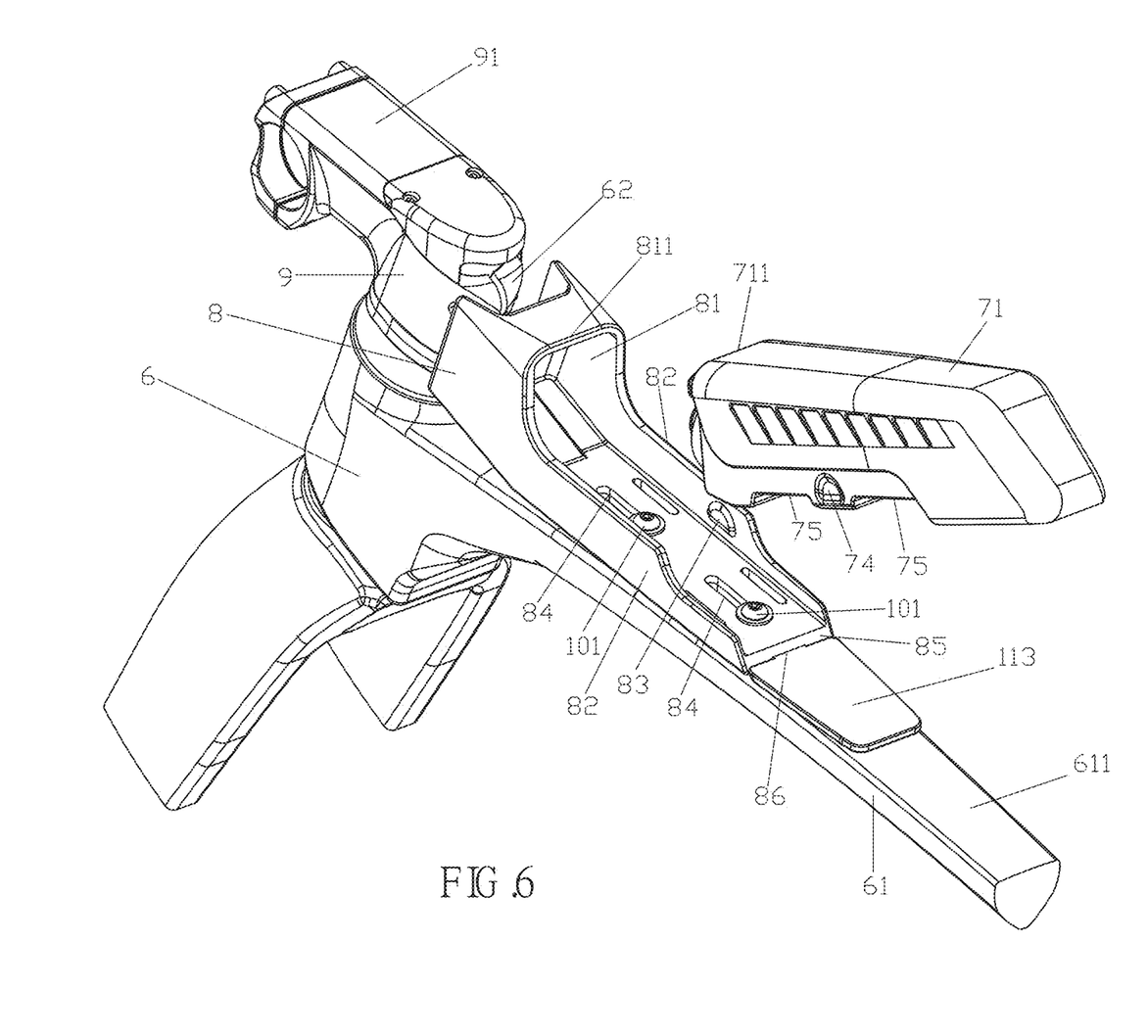
FIG. 6 is a schematic view showing the operation of the water bottle holding device according to the embodiment of the present invention, wherein a water bottle is to be placed in a water bottle cage.
Figure 7:
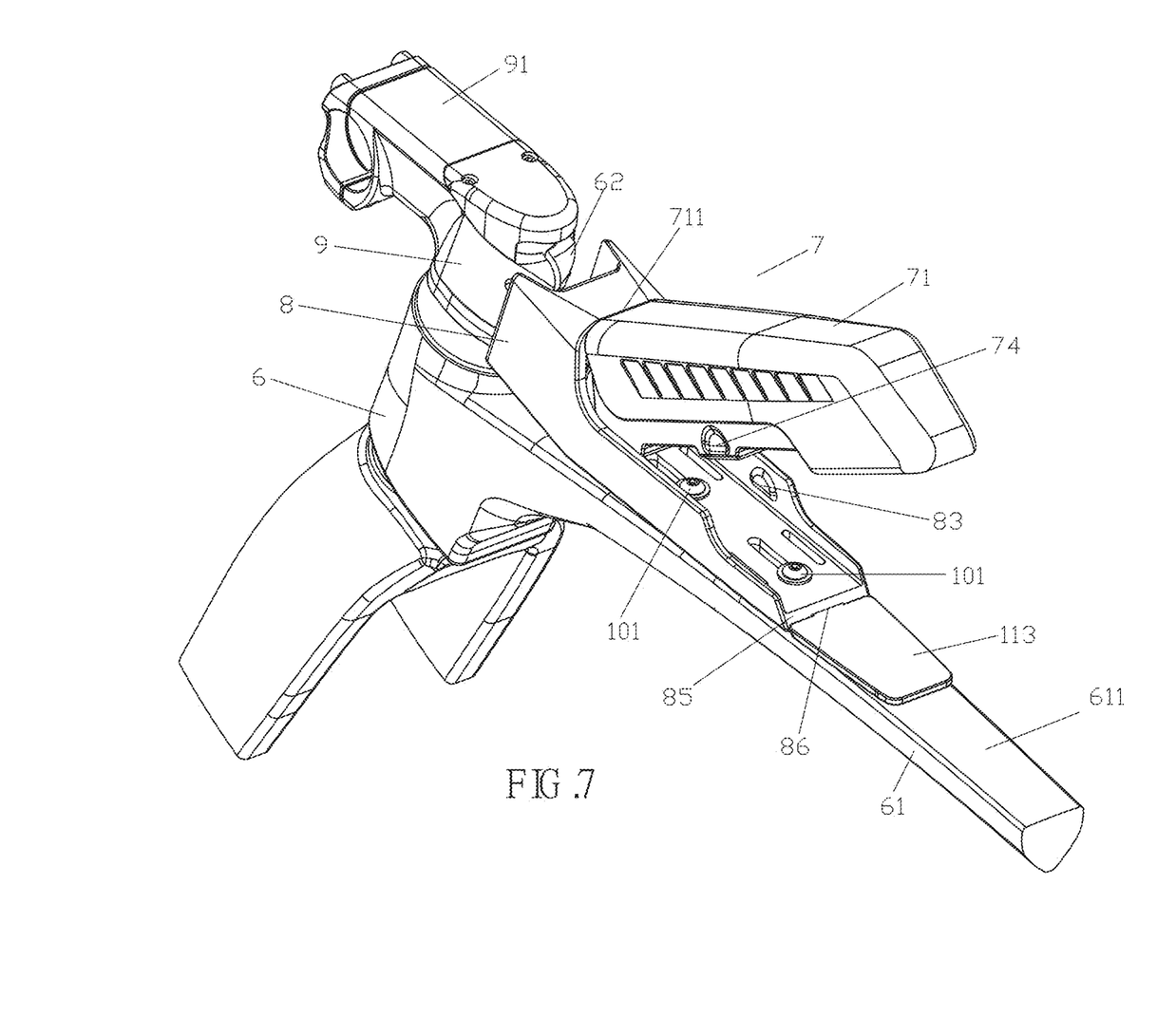
FIG. 7 is a schematic view showing the operation of the water bottle holding device according to the embodiment of the present invention, wherein the front end of the water bottle is received in a receiving room at the front section of the water bottle cage.
Figure 8:
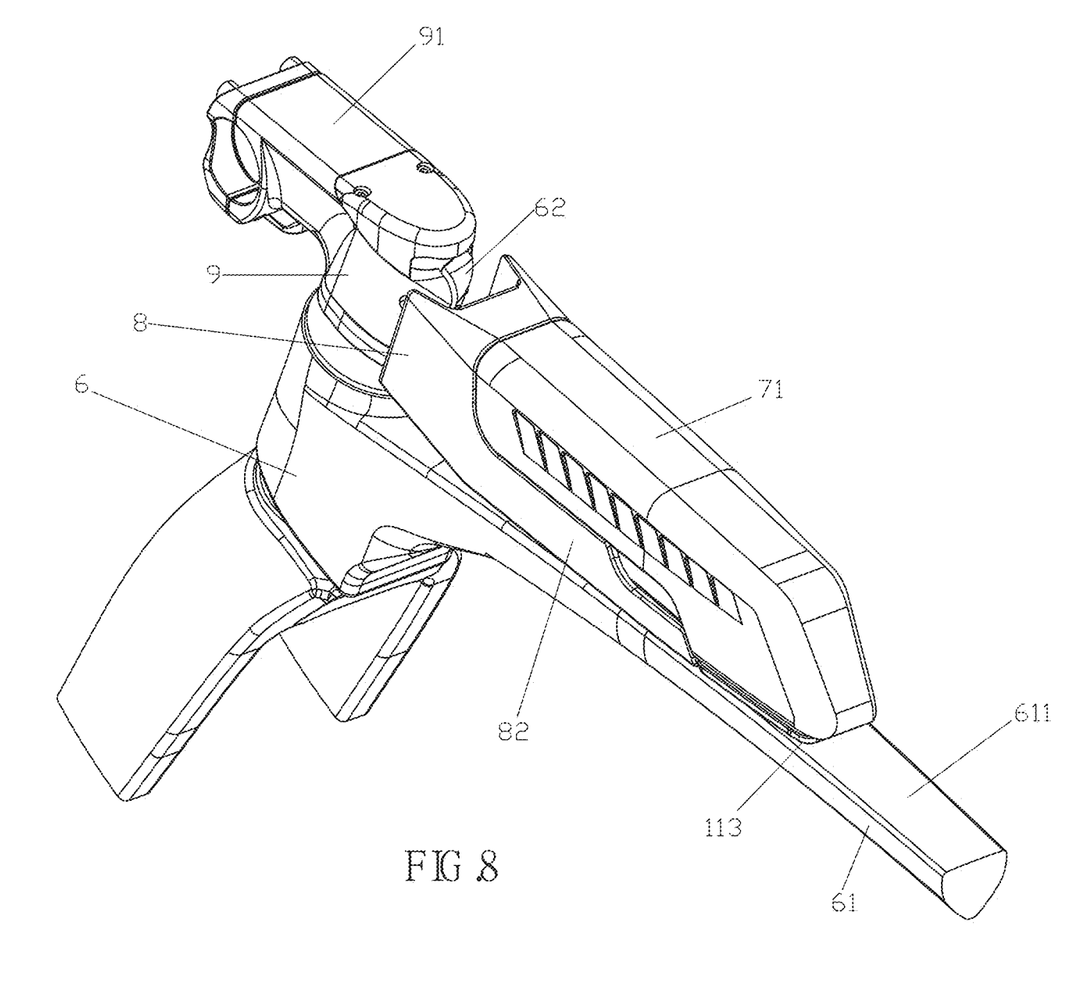
FIG. 8 is a schematic view showing the operation of the water bottle holding device according to the embodiment of the present invention, wherein the water bottle is inserted and positioned in the water bottle cage.

The water bottle 7 includes a water bottle body 71, a water bottle cap 72, and a mouthpiece 73. The water bottle body 71 has a blocking rim 711 on the periphery of a front end thereof, a first engaging portion 74 on each of two sides thereof, and receiving grooves 75 on an underside thereof.

Figure 12:
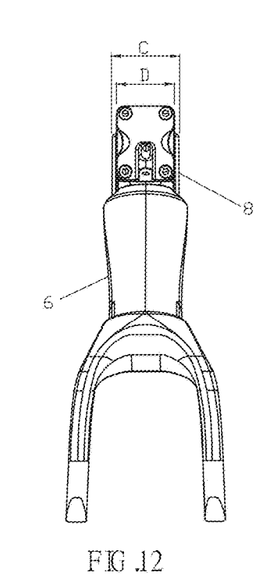
FIG. 12 is a right side view of FIG. 8.

The water bottle cage 8 has a width C about equal to or less than a width D of a stem body 91 of a bicycle stem 9 (as shown in FIG. 12). The water bottle cage 8 has a receiving room 81 at a front section thereof, a positioning baffle 82 on each of two sides thereof, a second engaging portion 83 on an inner side of the positioning baffle 82, a plurality of locking holes 84 passing through a bottom thereof, and a rear end 85 that is an open end.

Figure 9:
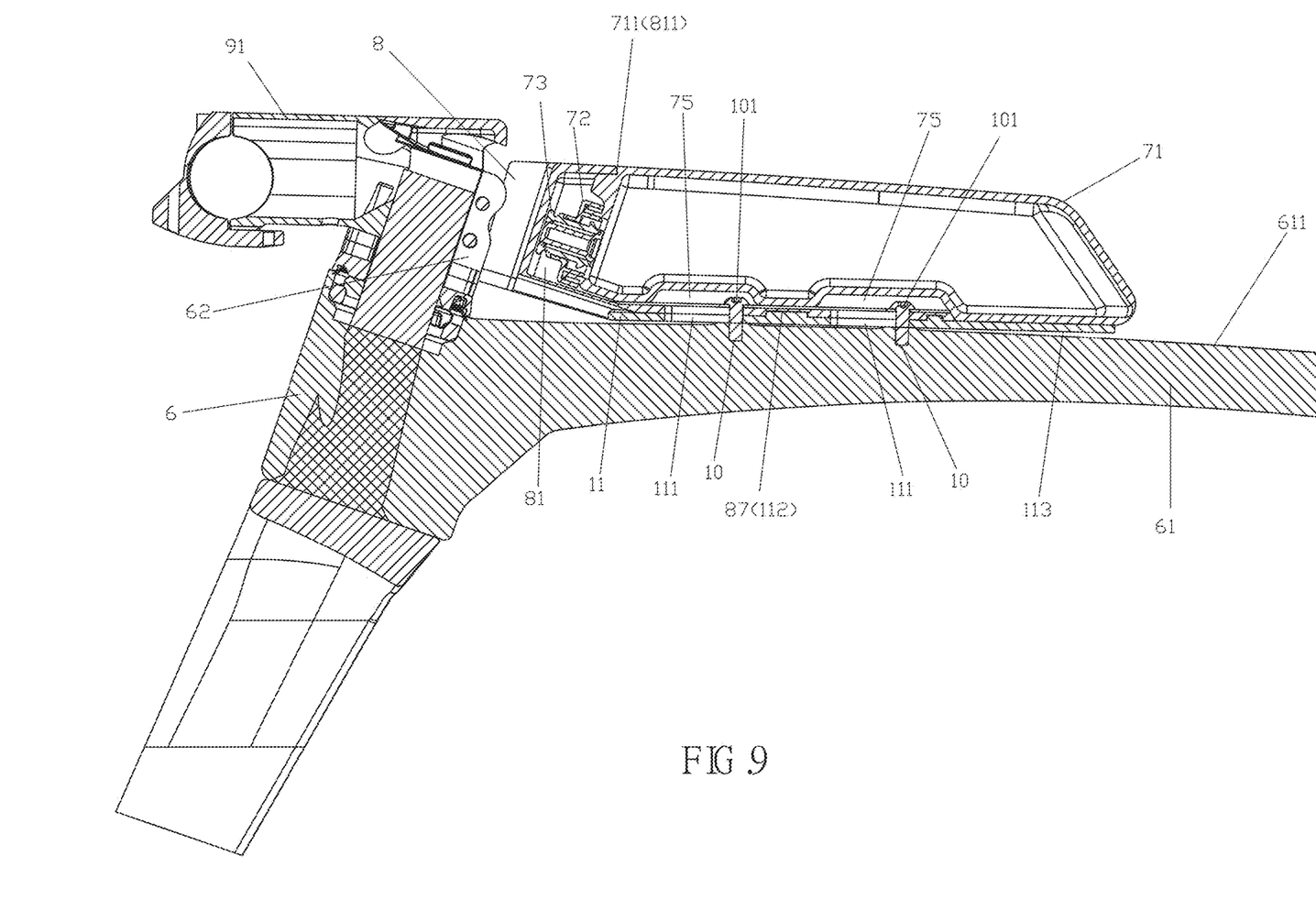
FIG. 9 is a cross-sectional view of FIG. 8.
Figure 10:
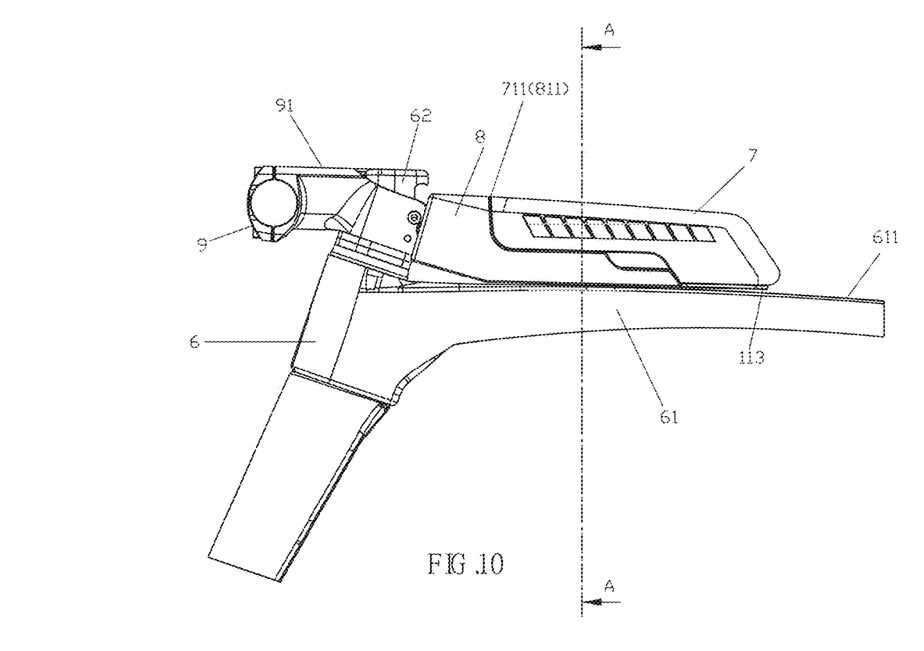
FIG. 10 is a front view of FIG. 8.
Figure 11:
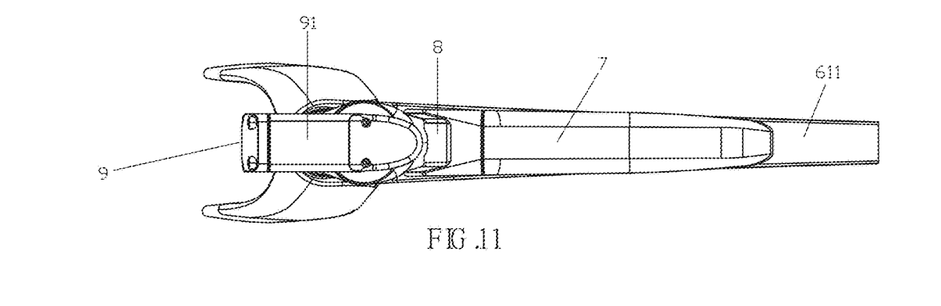
FIG. 11 is a top view of FIG. 8.
Figure 13:
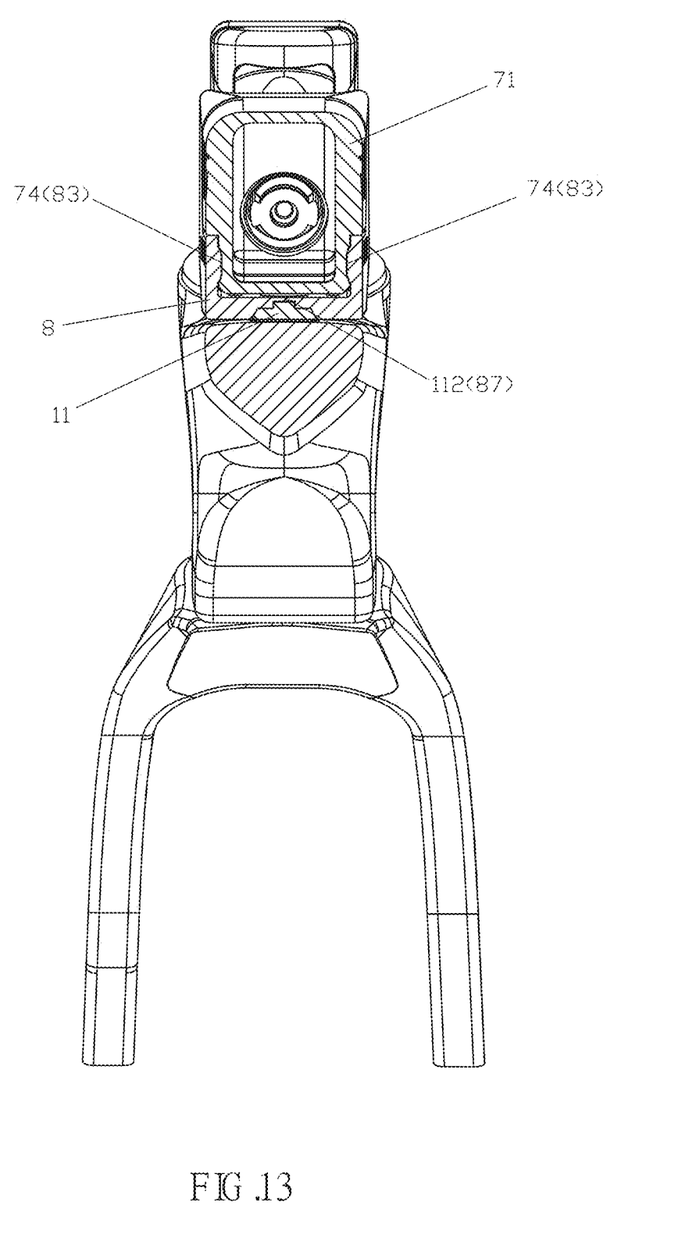
FIG. 13 is an enlarged sectional view taken along line A-A of FIG. 10.
Figure 14:
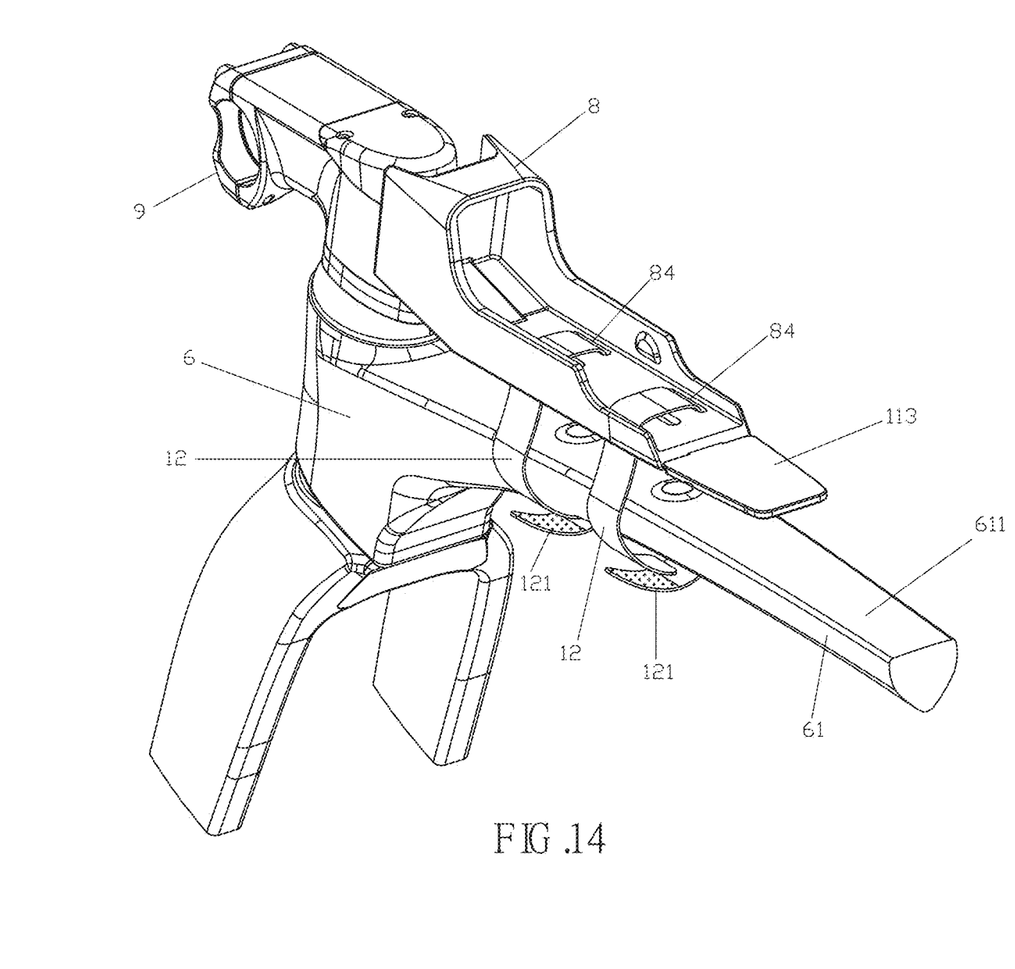
FIG. 14 is a schematic view showing the connection of the water bottle cage and the top tube of the bicycle frame according to another embodiment of the present invention, wherein an adhesive strap having a hook-and-loop fastener is inserted through locking holes of the bottom of the water bottle cage and coupled to the top tube.
Figure 15:
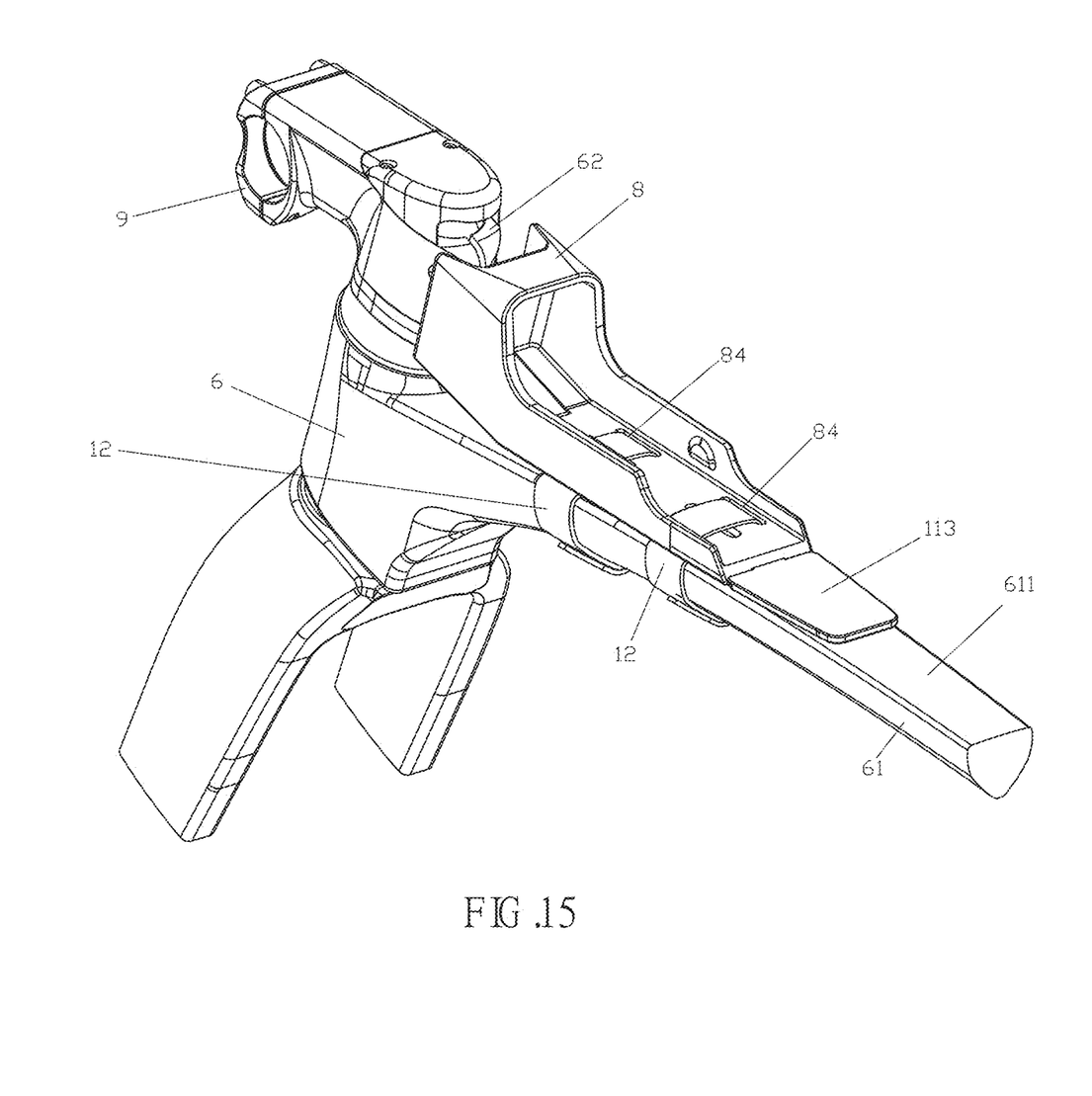
FIG. 15 is a schematic view of FIG. 14.
Figure 16:
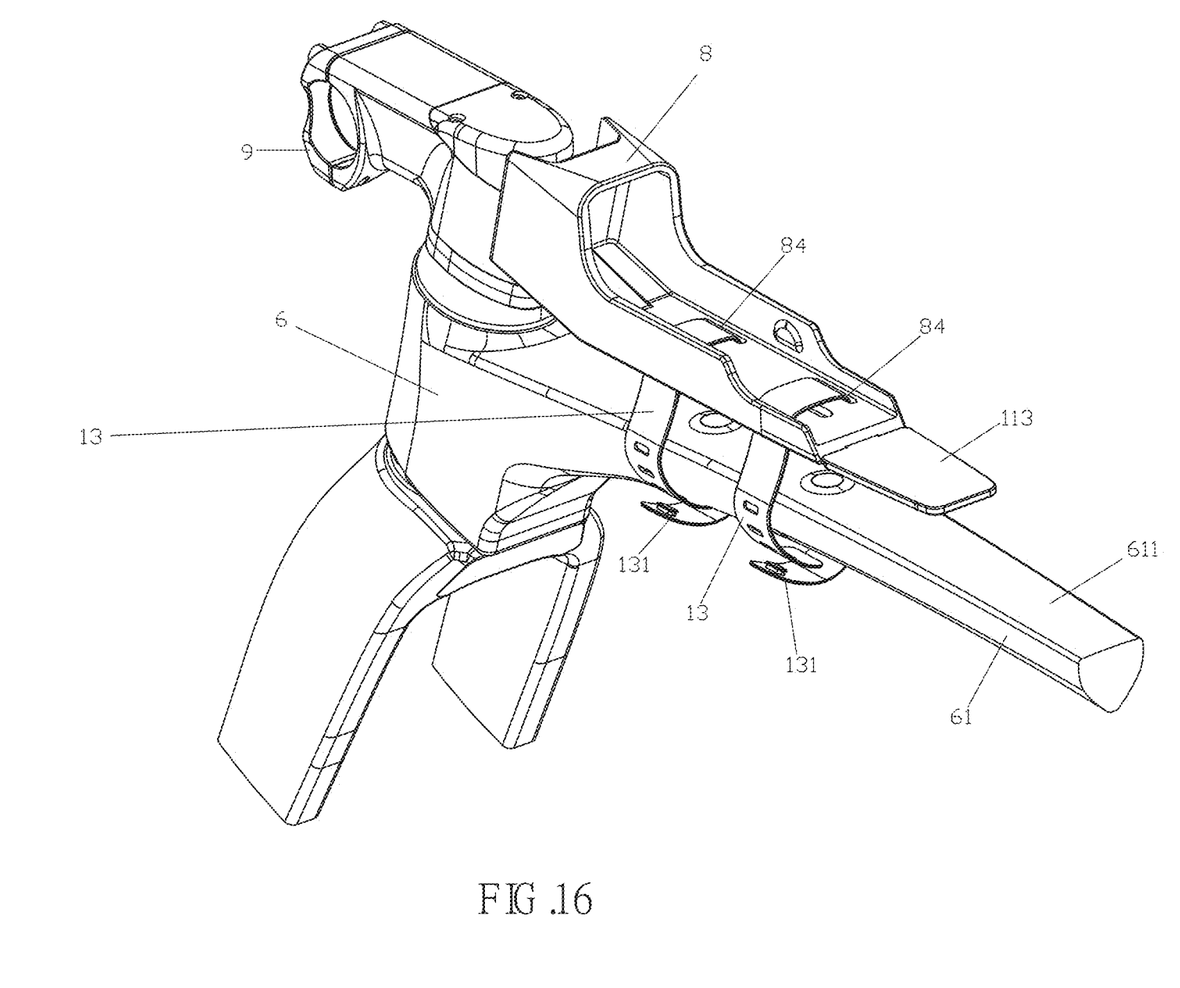
FIG. 16 is a schematic view showing the connection of the water bottle cage and the top tube of the bicycle frame according to a further embodiment of the present invention, wherein a strap having a buckle is inserted through the locking holes of the bottom of the water bottle cage and coupled to the top tube.
Figure 17:
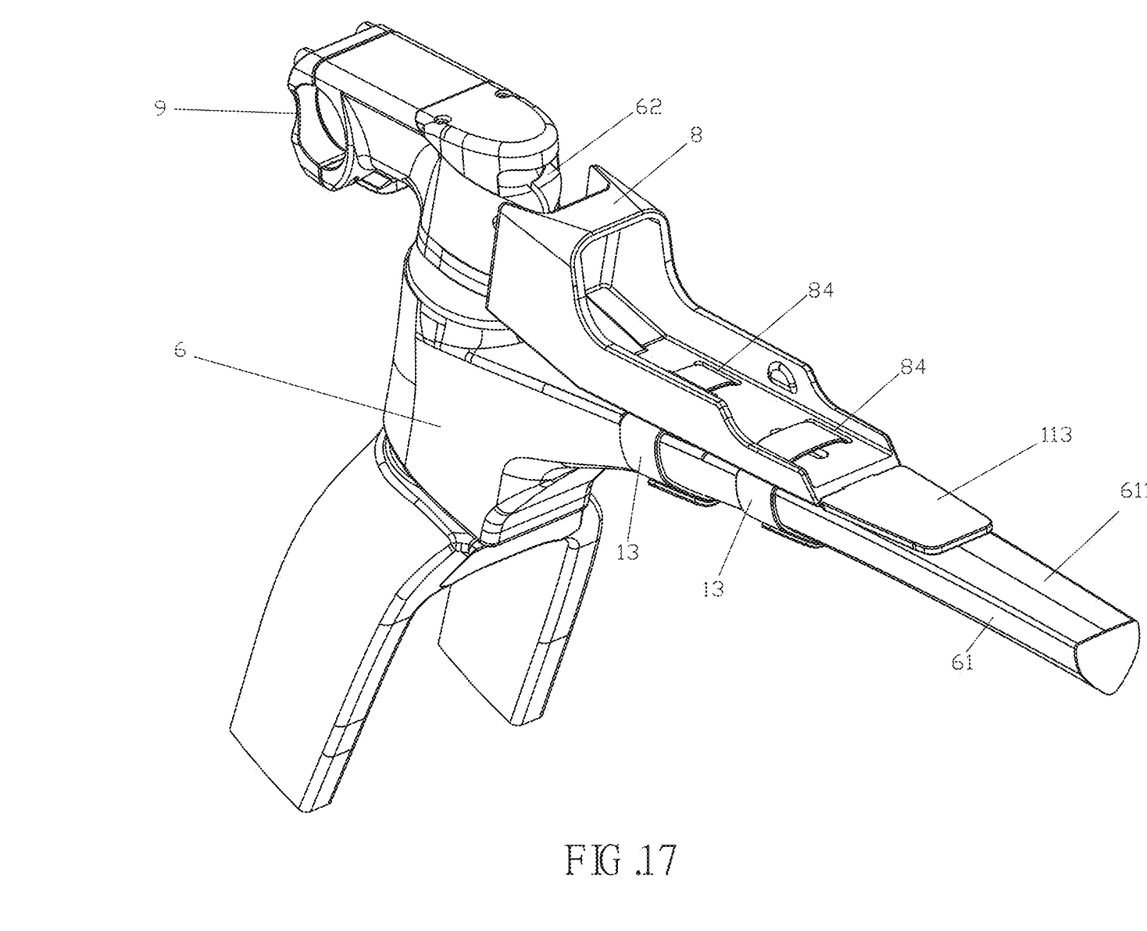
FIG. 17 is a schematic view of FIG. 16.
Figure 18:
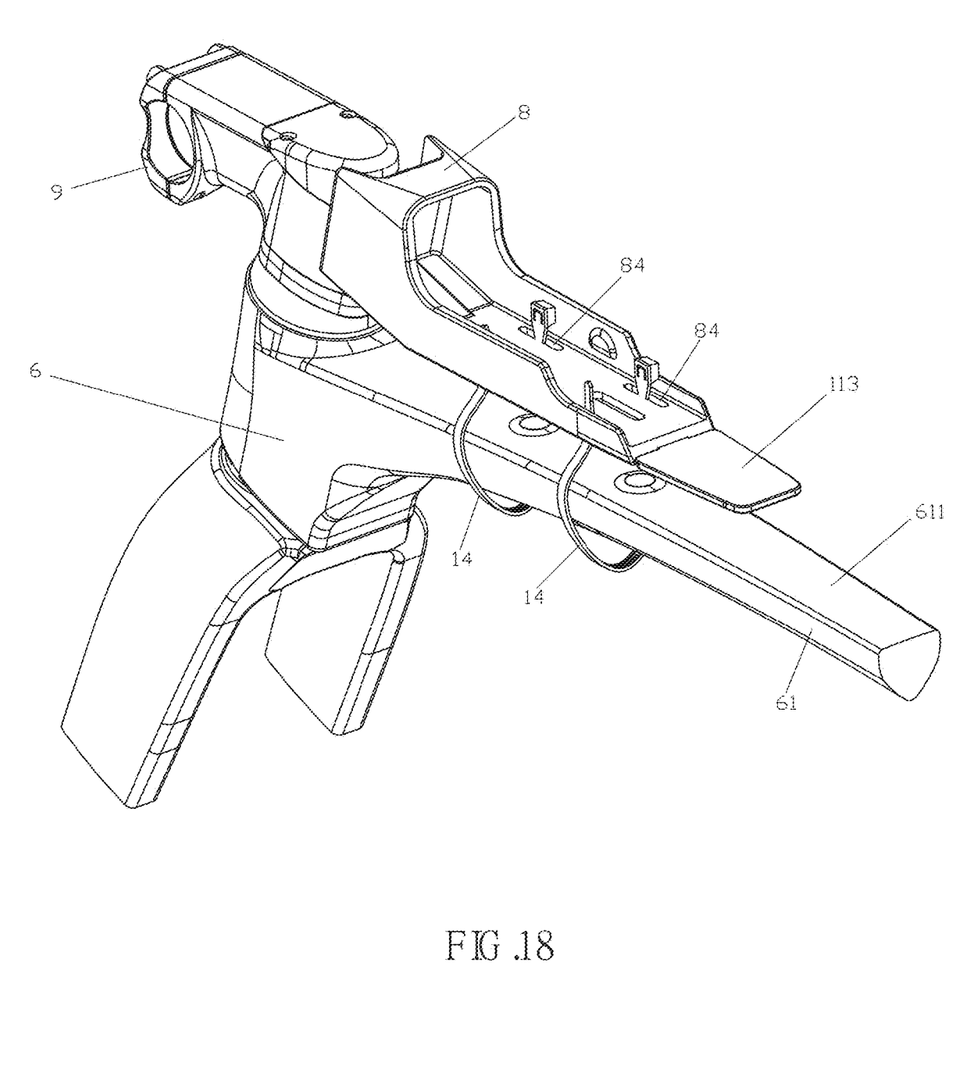
FIG. 18 is a schematic view showing the connection of the water bottle cage and the top tube of the bicycle frame according to a yet further embodiment of the present invention, wherein a cable tie is inserted through the locking holes of the bottom of the water bottle cage and coupled to the top tube.
Figure 19:
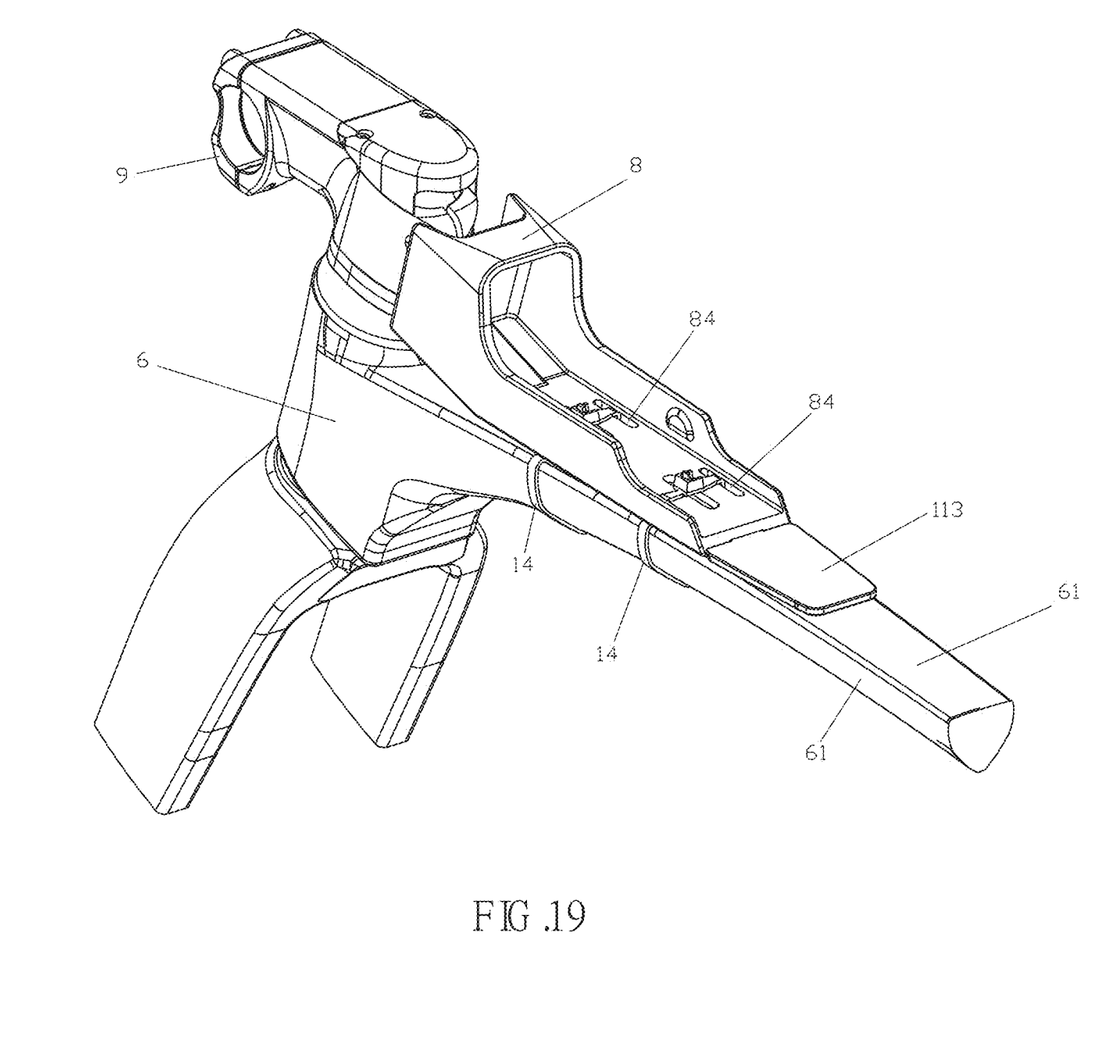
FIG. 19 is a schematic view of FIG. 18.

When in use, the water bottle cage 8 is placed on a top surface 611 of the top tube 61 of the bicycle frame 6, and a plurality of locking elements 10 are inserted through the plurality of locking holes 84 of the bottom of the water bottle cage 8 and connected to locking holes 612 of the top surface 611 of the top tube 61 of the bicycle frame 6, so that the water bottle cage 8 is coupled to the top tube 61 of the bicycle frame 6. Then, the water bottle 7 is inserted from the rear end 85 of the water bottle cage 8, so that the mouthpiece 73 and the water bottle cap 72 on the front end of the water bottle 7 are received in the receiving room 81 at the front section of the water bottle cage 8. The blocking rim 711 on the periphery of the front end of the water bottle body 71 is against an outer edge 811 of the receiving room 81 of the water bottle cage 8, the water bottle body 71 is pressed down, and the first engaging portions 74 on the two sides of the water bottle body 71 are engaged with the second engaging portions 83 on the inner sides of the positioning baffles 82 on the two sides of the water bottle cage 8, as shown in FIG. 13, such that the water bottle 7 is inserted and secured in the water bottle cage 8. Portions 101 of the plurality of locking elements 10 that are inserted through the plurality of locking holes 84 of the bottom of the water bottle cage 8 and connected to the locking holes 612 of the top surface 611 of the top tube 61 of the bicycle frame 6, protruding from the top surface of the bottom of the water bottle cage 8, are hidden in the receiving grooves 75 of the underside of the water bottle 7, as shown in FIG. 9.

Accordingly, the water bottle cap 72 and the mouthpiece 73 on the front end of the water bottle 7 are hidden in the receiving room 81 at the front section of the water bottle cage 8, so as to avoid contamination by pollutants such as sand, dust or rain. When a bicyclist needs to drink water while riding, he/she can directly pulls the rear end of the water bottle body 71 of the water bottle 7 secured in the water bottle cage 8 upward and then moves it backward to separate the entire water bottle 7 from the water bottle cage 8, so that the bicyclist can drink water from the mouthpiece 73 of the water bottle 7 to quench his/her thirst and replenish water. After the bicyclist drinks water, the water bottle 7 can be easily inserted in the water bottle cage 8 in a reverse direction again. Besides, after the water bottle 7 is held in the water bottle cage 8, the width C of the water bottle cage 8 is about equal to or less than the width D of the stem body 91 of the bicycle stem 9. When the bicyclist is riding, the entire water bottle holding device has a wind-breaking shape to increase the riding speed.

Referring to FIG. 4 through FIG. 9 and FIG. 13, a restricting groove 86 and an alignment groove 87 are disposed on the bottom of the water bottle cage 8. An anti-scratch plate 11 is provided below the water bottle cage 8. The anti-scratch plate 11 has locking holes 111, a positioning protrusion 112, and a distal section 113 extending beyond the rear end 85 of the water bottle cage 8. The anti-scratch plate 11 is first placed on the top surface 611 of the top tube 61 of the bicycle frame 6, and then the restricting groove 86 of the bottom of the water bottle cage 8 is engaged with the front section of the anti-scratch plate 11. The alignment groove 87 of the bottom of the water bottle cage 8 is aligned with the positioning protrusion 112 of the anti-scratch plate 11. A plurality of locking elements 10 are inserted through the plurality of locking holes 84 of the bottom of the water bottle cage 8 and the locking holes 111 of the anti-scratch plate 11 and connected to the locking holes 612 of the top surface 611 of the top tube 61 of the bicycle frame 6, such that the water bottle cage 8 and the anti-scratch plate 11 are coupled to the top tube 61 of the bicycle frame 6. Then, the water bottle 7 is inserted from the rear end 85 of the water bottle cage 8, so that the mouthpiece 73 and the water bottle cap 72 on the front end of the water bottle 7 are received in the receiving room 81 at the front section of the water bottle cage 8. The blocking rim 711 on the periphery of the front end of the water bottle body 71 is against the outer edge 811 of the receiving room 81 of the water bottle cage 8, the water bottle body 71 is pressed down, and the first engaging portions 74 on the two sides of the water bottle body 71 are engaged with the second engaging portions 83 on the inner sides of the positioning baffles 82 on the two sides of the water bottle cage 8, so that the water bottle 7 is inserted and secured in the water bottle cage 8. In this operation, the water bottle body 71 can be minimized from directly touching the top surface 611 of the top tube 61, so as to prevent scratches on the top surface 611 of the top tube 61.

Referring to FIG. 5, FIG. 6, FIG. 14 and FIG. 15, the locking elements 10 used for locking the water bottle cage 8 and the anti-scratch plate 11 to the top tube 61 of the bicycle frame 6 are replaced with an adhesive strap 12 having a hook-and-loop fastener 121 to pass through the locking holes 84 of the water bottle cage 8, such that the water bottle cage 8 is coupled to the top tube 61 of the bicycle frame 6. Alternatively, the adhesive strap 12 having the hook-and-loop fastener 121 is inserted through the locking holes 84 of the water bottle cage 8 and the locking holes 111 of the anti-scratch plate 11, such that the water bottle cage 8 and the anti-scratch plate 11 are coupled to the top tube 61 of the bicycle frame 6.

Referring to FIG. 5, FIG. 6, FIG. 16 and FIG. 17, the locking elements 10 used for locking the water bottle cage 8 and the anti-scratch plate 11 to the top tube 61 of the bicycle frame 6 are replaced with a strap 13 having a buckle 131 to pass through the locking holes 84 of the water bottle cage 8, such that the water bottle cage 8 is coupled to the top tube 61 of the bicycle frame 6. Alternatively, the strap 13 having the buckle 131 is inserted through the locking holes 84 of the water bottle cage 8 and the locking holes 111 of the anti-scratch plate 11, such that the water bottle cage 8 and the anti-scratch plate 11 are coupled to the top tube 61 of the bicycle frame 6.

Referring to FIG. 5, FIG. 6, FIG. 18 and FIG. 19, the locking elements 10 used for locking the water bottle cage 8 and the anti-scratch plate 11 to the top tube 61 of the bicycle frame 6 are replaced with a cable tie 14 to pass through the locking holes 84 of the water bottle cage 8, such that the water bottle cage 8 is coupled to the top tube 61 of the bicycle frame 6. Alternatively, the cable tie 14 is inserted through the locking holes 84 of the water bottle cage 8 and the locking holes 111 of the anti-scratch plate 11, such that the water bottle cage 8 and the anti-scratch plate 11 are coupled to the top tube 61 of the bicycle frame 6.

Although particular embodiments of the present invention have been described in detail for purposes of illustration, various modifications and enhancements may be made without departing from the spirit and scope of the present invention. Accordingly, the present invention is not to be limited except as by the appended claims.

What is claimed is:

1. A water bottle holding device, mounted on top of a top tube of a bicycle frame and located adjacent a bicycle stem and behind a head tube, comprising:
    a water bottle, including a water bottle body, a water bottle cap and a mouthpiece, the water bottle body having a blocking rim on a periphery of a front end thereof and a first engaging portion on each of two sides thereof;
    a water bottle cage, having a width about equal to or less than a width of a stem body of the bicycle stem, the water bottle cage having a receiving room at a front section thereof, a positioning baffle on each of two sides thereof, a second engaging portion on an inner side of the positioning baffle, a plurality of locking holes passing through a bottom thereof, and a rear end that is an open end.

2. The water bottle holding device as claimed in claim 1, wherein the water bottle body has receiving grooves on an underside thereof.

3. The water bottle holding device as claimed in claim 1, wherein a top surface of the top tube of the bicycle frame has locking holes, the water bottle cage is placed on the top surface of the top tube of the bicycle frame, and a plurality of locking elements are inserted through the plurality of locking holes of the bottom of the water bottle cage and connected to the locking holes of the top surface of the top tube of the bicycle frame so that the water bottle cage is coupled to the top tube of the bicycle frame; the water bottle is inserted from the rear end of the water bottle cage so that the mouthpiece and the water bottle cap on the front end of the water bottle are received in the receiving room at the front section of the water bottle cage, the blocking rim on the periphery of the front end of the water bottle body is against an outer edge of the receiving room of the water bottle cage, the water bottle body is pressed down, and the first engaging portions on the two sides of the water bottle body are engaged with the second engaging portions on the inner sides of the positioning baffles on the two sides of the water bottle cage, such that the water bottle is inserted and secured in the water bottle cage.

4. The water bottle holding device as claimed in claim 1, wherein an adhesive strap having a hook-and-loop fastener is inserted through the locking holes of the water bottle cage for coupling the water bottle cage to the top tube of the bicycle frame.

5. The water bottle holding device as claimed in claim 1, wherein a strap having a buckle is inserted through the locking holes of the water bottle cage for coupling the water bottle cage to the top tube of the bicycle frame.

6. The water bottle holding device as claimed in claim 1, wherein a cable tie is inserted through the locking holes of the water bottle cage for coupling the water bottle cage to the top tube of the bicycle frame.

7. The water bottle holding device as claimed in claim 1, wherein an anti-scratch plate is provided below the water bottle cage.

8. The water bottle holding device as claimed in claim 7, wherein the anti-scratch plate has locking holes and a distal section extending beyond the rear end of the water bottle cage, a plurality of locking elements are inserted through the plurality of locking holes of the bottom of the water bottle cage and the locking holes of the anti-scratch plate and connected to locking holes of a top surface of the top tube of the bicycle frame, such that the water bottle cage and the anti-scratch plate are coupled to the top tube of the bicycle frame.

9. The water bottle holding device as claimed in claim 7, wherein a restricting groove is disposed on the bottom of the water bottle cage for a front section of the anti-scratch plate to be engaged with the restricting groove.

10. The water bottle holding device as claimed in claim 7, wherein an alignment groove is disposed on the bottom of the water bottle cage, the anti-scratch plate has a positioning protrusion, and the alignment groove of the bottom of the water bottle cage is aligned with and connected to the positioning protrusion of the anti-scratch plate.

11. The water bottle holding device as claimed in claim 7, wherein an adhesive strap having a hook-and-loop fastener is inserted through the locking holes of the water bottle cage and the locking holes of the anti-scratch plate for coupling the water bottle cage and the anti-scratch plate to the top tube of the bicycle frame.

12. The water bottle holding device as claimed in claim 7, wherein a strap having a buckle is inserted through the locking holes of the water bottle cage and the locking holes of the anti-scratch plate for coupling the water bottle cage and the anti-scratch plate to the top tube of the bicycle frame.

13. The water bottle holding device as claimed in claim 7, wherein a cable tie is inserted through the locking holes of the water bottle cage and the locking holes of the anti-scratch plate for coupling the water bottle cage and the anti-scratch plate to the top tube of the bicycle frame.

* * * * *